Figure 4:
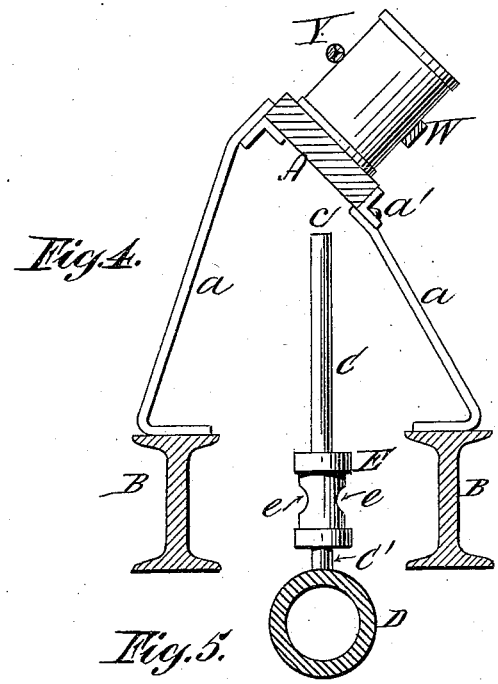

(No Model.) 3 Sheets—Sheet 1.
O. S. FELLOWS.
HEATING AND SOLDERING MACHINE.
No. 557,366. Patented Mar. 31, 1896.
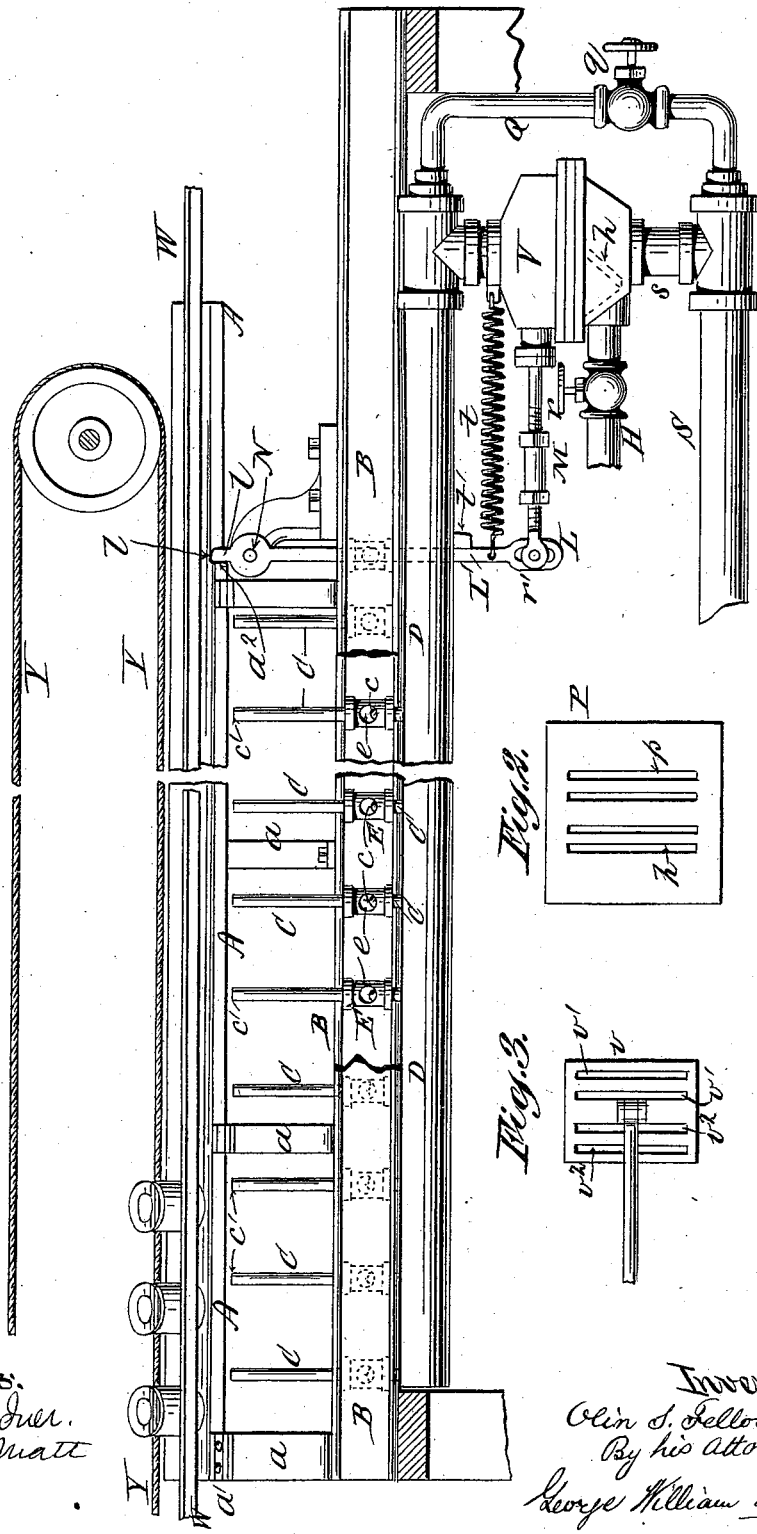

(No Model.) 3 Sheets—Sheet 2.

O. S. FELLOWS.
HEATING AND SOLDERING MACHINE.

No. 557,366. Patented Mar. 31, 1896.

(No Model.) 3 Sheets—Sheet 3.

O. S. FELLOWS.
HEATING AND SOLDERING MACHINE.

No. 557,366. Patented Mar. 31, 1896.

UNITED STATES PATENT OFFICE.

OLIN S. FELLOWS, OF MIDDLETOWN, NEW YORK.

HEATING AND SOLDERING MACHINE.

SPECIFICATION forming part of Letters Patent No. 557,366, dated March 31, 1896.

Application filed July 6, 1895. Serial No. 555,156. (No model.)

*To all whom it may concern:*

Be it known that I, OLIN S. FELLOWS, a citizen of the United States, residing at Middletown, in the county of Orange and State of New York, have invented certain new and useful Improvements in Heating and Soldering Machines, of which the following is a specification sufficient to enable others skilled in the art to which the invention appertains to make and use the same.

My improvements relate more especially to the soldering of the joints of sheet-metal cans, although applicable to other uses in which solid solder is melted to enable it to unite superposed surfaces and seal them when cool.

Heretofore sheet-metal cans have been passed over baths of melted solder in such manner that the seams to be soldered have been submerged more or less in the bath, with the result that the melted solder has been drawn in between the superposed surfaces by the aid of gravity and capillary attraction, sealing the joints when cool. This method of soldering, however, is objectionable for several reasons. A high degree of heat has to be applied and maintained in order to keep the comparatively large bulk of solder necessary to form a bath in liquid form, creating a heavy percentage of loss by both vaporization and oxidation, the latter result being an especially objectionable feature, as it not only wastes the solder but also fouls the bath. The sheet metal also takes up an unnecessary amount of solder, since the latter clings to the exterior surfaces, which take up as much and more than that absorbed by the joint or seam. There is a double defect here also, since the exterior solder is not only wasted but disfigures and renders irregular the exterior surface of the can. I have invented methods which overcome these difficulties by the application of only sufficient solder to seal the joints applied in solid form, and melted *in situ*, as set forth in my applications, Serial Nos. 550,338, 550,339, and 550,340, filed May 23, 1895.

My present invention relates to means for carrying out my method, broadly stated, of first applying the solid solder to the can-joints in solid form and then melting the solder by subjecting the parts to a suitable degree of heat, although the invention is applicable to other similar uses in which articles are to be subjected to a steady uniform degree of heat.

The invention consists, primarily, in passing the unsealed can-joints, provided with an appropriate quantity of solid solder, over a metallic soldering table or bar heated to a prescribed degree, sufficient to melt the solder without vaporizing it, so as to cause the solder to seal the joints when cool, and, secondarily in importance, in utilizing the expansibility of the metal constituting the soldering table or bar to regulate the temperature of the same within certain limits by automatically controlling the supply of heat.

Incidentally my invention includes certain special features of construction and arrangement for forwarding the cans over the soldering-table, connecting the soldering-table with the gas-supply valve, connecting the soldering-table with a valve for the supply of air under pressure, combining the air and gas supply valves in one casing, so that the supply of both is controlled by the same mechanism, and forming the gas-burners so that each draws in automatically an auxiliary supply of air in proportion to the amount consumed.

The maintenance of a uniform prescribed degree of heat in and throughout the heating-table is of practical importance in sealing cans by my method, in order to insure the melting of the solder without evaporation or oxidation and an even flow of the solder to all parts of the joint. By utilizing the expansion and contraction of the metallic heating-table to regulate the supply of heat I am enabled to maintain the temperature of the table automatically within a variation of only a few degrees from that prescribed as the most appropriate, the fluctuations being so slight and gradual as to be practically unimportant.

Figure 5:
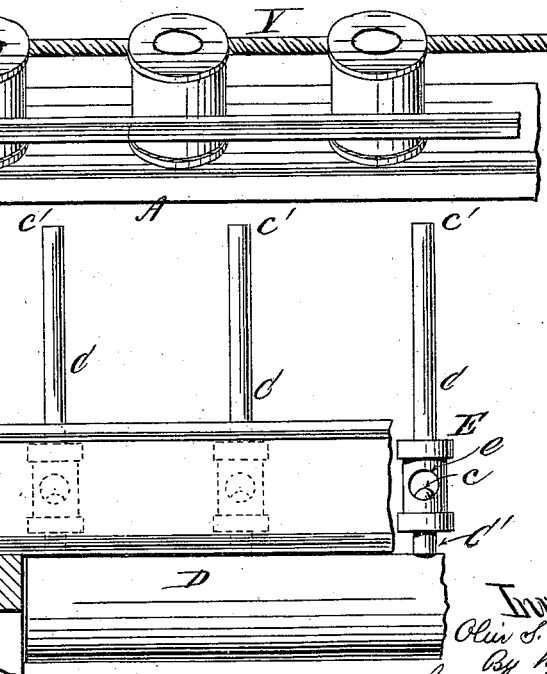
Figure 6:
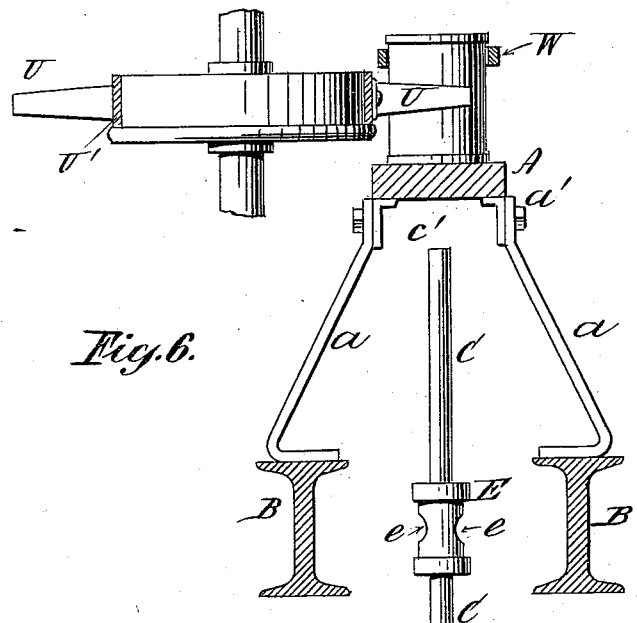
Figure 8:
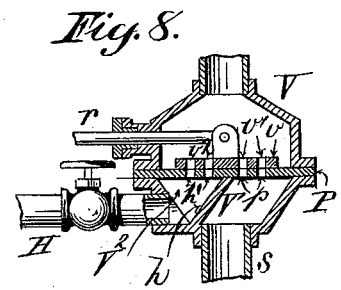
Figure 7:
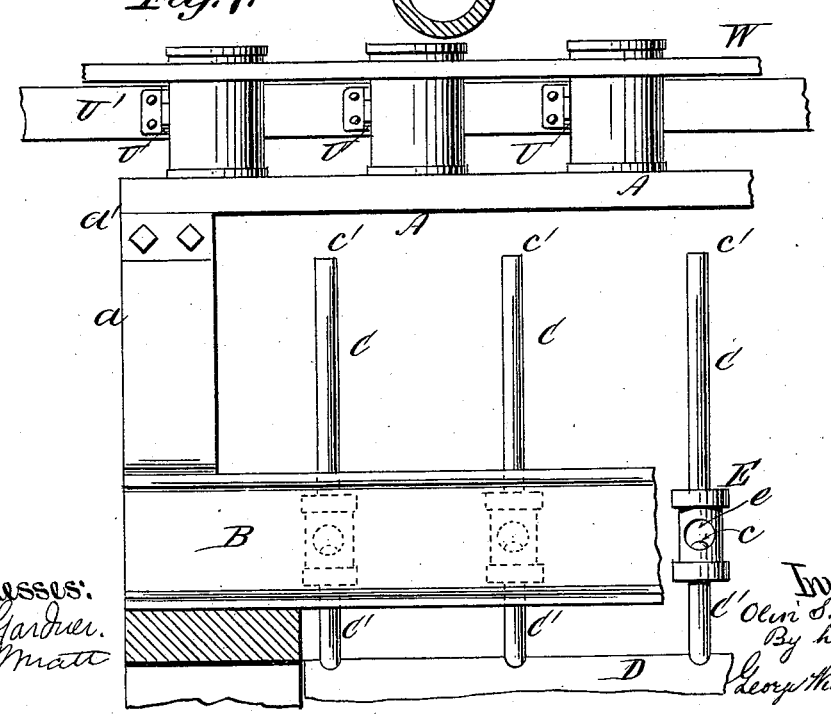

In the accompanying drawings, Figure 1 is a sectional elevation showing essential parts of my improved apparatus. Fig. 2 is a plan of the port-plate of the regulating-valve; Fig. 3, a plan of the valve itself; Fig. 4, a sectional elevation through the soldering-table and adjoining parts. Fig. 5 is an elevation of a portion of the apparatus near one extremity. Fig. 6 is a transverse sectional view showing a modification in the arrangement of the apparatus. Fig. 7 is a view, similar to Fig. 5, of said modification. Fig. 8 is a central vertical section of the air and gas valve.

In carrying my invention into practical use the soldering-table A, in conjunction with means for heating it, is the essential feature. The soldering-table A may be of any desired form or configuration without departing from the spirit and intent of my invention. As shown in the drawings, it consists of an elongated bar of metal; but it may obviously be made circular or rectangular in form.

The means employed for heating the soldering-table A is of secondary importance, provided a steady uniform heat can be imparted to and maintained in the soldering-table A.

Although I do not limit myself to any specific means for heating the soldering-table A, I have found it convenient to employ gas for this purpose, and have herein shown the heating apparatus as adapted to the use of such fuel.

The soldering-table A is supported upon suitable uprights $a\ a$ resting upon a bed or framework B B. Under the soldering-table A are arranged a series of gas-jets C, fed by a common distributing-pipe D. Each gas jet or burner C is provided with a chamber or enlargement E, formed with air-ports $e\ e$. Into the lower part of this chamber E the lower section C' of the pipe projects, being formed with a comparatively small aperture $c$ for the escape of the gas. Hence when the gas is burning at $c'$ an auxiliary supply of air is drawn in through the ports $e$ and mixes with the gas from the aperture $c$ on its way through the pipe C. By this means the gas-jets draw in or supply themselves automatically with an auxiliary supply of air as needed.

One extremity of the soldering-table A is rigidly secured to a stationary part of the framework, as at $a'$, the other extremity of the soldering-table being free and the main portion thereof simply resting on the supports or standards $a$, so that the table is at liberty to expand longitudinally in one direction.

I avail myself of the expansion of the soldering-table under heat, or its retraction under reduced heat, in such manner that the supply of gas is regulated and controlled so as to maintain the soldering-table A at a temperature variable slightly from the desired degree of heat. In order to attain this result where the temperature must necessarily be comparatively high, it is necessary that the regulating mechanism be rendered very sensitive and delicate in operation, and this I accomplish by means of a lever L, the short arm $l$ of which impinges against a shoulder upon the soldering-table A, while the long arm L' engages with the valve-rod $r$ attached to the valve $v$ in the valve-casing V. The lower part of the valve-casing V is connected by the pipe $s$ with the main gas-supply pipe S and with the air-supply pipe H, a partition $h$ dividing said lower part of the casing V into a gas-chamber V' and an air-chamber V$^2$. Interposed between the upper and lower sections of the valve-casing V is a port-plate P, formed with the elongated ports $p\ p$ opening into the gas-chamber V' and the ports $h'\ h'$ opening into the air-chamber V$^2$. The ports $v'\ v'$ in the valve $v$ coincide with the ports $p$ in the port-plate P and the ports $v^2\ v^2$ with the ports $h'\ h'$ when the valve $v$ is in the retracted position, which position it tends constantly to assume by reason of the action of the retractile spring $t$, which draws the long arm L' of the lever against the stop $t'$ and holds it there until the expansion of the table A forces the short arm $l$ of the lever L backward, thereby throwing forward the long arm L' and closing the ports $p$ more or less. The position of the fulcrum N is such that the comparatively slight extent of movement longitudinally of the table A by expansion is multiplied at the point $r'$, at which the valve-rod $r$ is connected with the lever, sufficiently to give ample motion for the closing of the ports $p\ h'$ under a variation of but a few degrees of temperature.

The machine having been set in order and the table A heated to the degree desired, the position of the lever L is adjusted with relation to the shoulder $a^2$ by means of the right and left hand nut-link M or equivalent mechanism. Thus if the expansion continues the ports will be gradually closed, shutting off the supply of gas and air more or less to the jets C, when, contraction having set in and the soldering-table A becoming shorter, the spring $t$ returns the valve to its normal position, or partially so, until again drawn forward by the reëxpansion of the soldering-table A under the action of the increased supply of fuel.

Means for adjusting the lever L with accuracy with relation to the shoulder $a^2$ on the soldering-table A are of importance in setting the apparatus so that it will operate accurately within a few degrees Fahrenheit, as any considerable variation below the point prescribed would interfere with the proper melting and running of the solder, while any decided excess of heat would cause a discoloration of the surface of the tin.

An auxiliary pipe Q connects the branch supply-pipe $s$ with the distributing-pipe so as to supply the latter with gas independent of the valve $v$, if desired, a valve $q$ being interposed in the said pipe Q to shut off this passage when the valve $v$ is relied upon to control the admission of gas and air, the object being to afford an independent supply of gas to the burners to keep them lighted when the main valve $v$ is closed.

It will be seen that I make the same valve-casing V, valve $v$, lever L, &c., answer for both air and gas supply, but they may obviously be separated or duplicated, if desired. In fact, in certain cases the admixture of air with the gas before it reaches the burners may be dispensed with, while in other cases such an admixture under pressure may be desirable. In either case the supply of both gas and air are preferably controlled automatically, substantially as shown.

The soldering-table A may be set horizontally, as in Figs. 6 and 7, the cans being moved along its surface by forwarding-arms U upon an endless belt U'. I prefer, however, to incline the soldering-table A substantially as shown in the other figures, supporting the under side of the cans on a guiding-rail W or equivalent and causing the cans to roll thereon and over the face of the soldering-table A by means of an endless belt, chain, or wire rope Y.

What I claim as my invention, and desire to secure by Letters Patent, is—

1. An apparatus for soldering the seams of sheet-metal cans with solder applied thereto in solid form, the combination of a metallic table or support for the cans, means for heating said metallic table or support, and means for regulating automatically the temperature of said metallic table, for the purpose described.

2. In soldering apparatus, the combination of a metallic table rigidly secured at one extremity to a stationary part of the frame and free at the other extremity, means for heating said table, and means for controlling the supply of heat by the expansion and contraction of said table or bar, substantially in the manner described.

3. In soldering apparatus, the combination of a metallic heating-table rigidly secured at one extremity to a stationary part of the frame and free at the other extremity, a series of gas-burners for heating said table and a gas-supply valve operated and controlled by the expansion and contraction of said metallic table, substantially in the manner and for the purpose described.

4. In soldering apparatus, the combination of a metallic soldering-table rigidly secured at one extremity to a stationary part of the frame and free at the other extremity, a series of gas-burners for heating said table, provided with air-induction tubes, and a gas-supply valve operated and controlled by the expansion and contraction of said metallic table, substantially in the manner and for the purpose described.

5. In soldering apparatus, the combination of a metallic heating-table rigidly secured at one extremity to a stationary part of the frame and free at the other extremity, a series of gas-burners for heating said table, a gas-supply valve for controlling the supply of gas to said burners, and an intermediate lever connecting the free end of said table with the valve-stem of said valve for the purpose of augmenting the longitudinal motion caused by the expansion and contraction of the table and controlling the supply of gas to the burners, substantially in the manner and for the purpose described.

6. In soldering apparatus, the combination of a metallic heating-table rigidly secured at one extremity to a stationary part of the frame and free at the other extremity, a series of gas-burners for heating said table, a gas-supply valve for controlling the supply of gas to the burners, an air-supply valve for controlling the admixture of air under pressure to the gas, and an intermediate lever connecting the free end of said soldering-table with the valve-stem of said air-valve, substantially in the manner and for the purpose described.

7. In soldering apparatus, the combination of a metallic heating-table rigidly secured at one extremity to a stationary part of the frame and free at the other extremity, a series of gas-burners for heating said table, a combined gas and air valve for controlling the supply of mixed gas and air to the burners, and an intermediate lever connecting the free end of the said soldering-table with the valve-stem of said combined gas and air valve, substantially in the manner and for the purpose described.

OLIN S. FELLOWS.

Witnesses:
D. W. GARDNER,
GEORGE WILLIAM MIATT.